Patented July 20, 1954

2,684,346

UNITED STATES PATENT OFFICE 2,684,346

LATENT CURING CATALYSTS AND COMPOSITIONS CONTAINING SAME

Ralph F. Nickerson, Marblehead, Mass., assignor to Monsanto Chemical Company, St. Louis, Mo., a corporation of Delaware No Drawing. Application July 29, 1950,
Serial No. 176,779

9 Claims. (Cl. 260—29.4)

The present invention relates to improved latent curing catalysts for use with urea-formaldehyde pre-condensates and to textile finishing compositions comprising such latent curing catalysts and water-soluble urea-formaldehyde condensation products.

It is one object of the present invention to provide inexpensive latent curing catalysts for use with water solution of urea-formaldehyde condensation products.

A further object of this invention is to provide a water composition comprising a water-soluble urea-formaldehyde pre-condensate and an inexpensive latent curing catalyst which provides a high degree of catalysis at temperatures normally used in curing or heat setting such pre-condensates but which exhibits no appreciable catalysis at room temperatures during the normal period of use of the composition.

Still further objects and advantages of this invention will appear in the following description and the appended claims.

The latent curing catalysts of this invention consist essentially of a mixture of a water-soluble salt of monoethanolamine and a water-soluble salt of diethanolamine. The mixture may be substantially dry or in a water solution. The mixture should be free of acid and should contain an excess of the monoethanolamine or the diethanolamine or a mixture of these amines. The pH of a water solution of 35% by weight of the mixture should be between 7 and 9. If the pH is below 7 the mixture will cause appreciable polymerization of a water solution of a urea-formaldehyde pre-condensate at normal room temperatures. If the pH is above 9, the mixture does not have sufficient catalytic activity to effect rapid polymerization or curing of the urea-formaldehyde pre-condensate at normal curing temperatures of 250 to 330° F.

The mol ratio of monoethanolamine or its water-soluble salts to diethanolamine or its water-soluble salts is critical and should be within the range of 3:1 to 1:3. A substantially equimolecular ratio gives the best results and is preferred. If larger ratios of monoethanolamine to diethanolamine are used than those specified above, the mixture tends to exhibit an undesirably high level of catalytic activity at normal room temperatures resulting in an appreciable polymerization of urea-formaldehyde pre-condensates over a period of 5 to 8 hours. This is indicated by the fact that a mol ratio of monoethanolamine salt to diethanolamine salt of 9:1 will give a water solution of urea-formaldehyde pre-condensate which becomes cloudy after about 3 hours at 70 to 80° F. and will precipitate resin within 5 hours. If larger ratios of diethanolamine to monoethanolamine are used the catalyst mixture does not have sufficient activity to cure urea-formaldehyde condensation products rapidly at the temperatures normally used in textile finishing operations.

The catalyst mixture may be prepared in a variety of ways. One suitable method consists in dissolving the monoethanolamine and diethanolamine in water in the proper mol ratio and then adding a water-soluble acid, preferably a strong mineral acid such as hydrochloric acid, until the desired pH of 7 to 9 is obtained. This procedure is preferred. The solution of the salt of monoethanolamine and diethanolamine is then used as is or diluted or concentrated as desired.

Another suitable procedure consists in adding monoethanolamine or diethanolamine separately or together to a water solution of the acid using sufficient quantities of the acid and the amines to form the normal salt of the acid and adding excess amine as required to bring the solution to the proper pH.

Still another method which is useful in preparing the latent curing catalysts of this invention is to pass ethylene oxide into a water solution of ammonium chloride and ammonia until the required amount of diethanolamine and monoethanolamine hydrochloride has been formed in the solution and the pH of the solution is between 7 and 9.

As examples of water-soluble acids which are used in preparing the water-soluble salts of the mixture of monoethanolamine and diethanolamine, may be mentioned acetic acid, formic acid, propionic acid, oxalic acid, citric acid, malonic acid, tartaric acid and the like, and strong mineral acids, such as hydrochloric acid, sulfuric acid and phosphoric acid. The preferred acids are hydrochloric acid and phosphoric acid since they are inexpensive and provide excellent latent curing catalysts. Moreover, they do not appreciably tender cellulosic fabrics to which the urea-formaldehyde pre-condensates are applied.

The finishing compositions of this invention consist essentially of from 3 to 35% of a water-soluble urea-formaldehyde condensate product, from 1 to 15% by weight on the weight of the condensation product of the mixture of water-soluble salts of monoethanolamine and diethanolamine, and water. The compositions may also contain small amounts of wetting agents of the anionic type such as dodecyl benzene sodium sulfonate, or the nonionic type such as polyethylene glycols or cationic surface active agents such as dimethyl cetyl benzyl ammonium chloride, and lubricants, softening agents or the like. Such agents normally comprise less than 10% by weight of the composition.

These compositions are particularly suitable for application to textile fabrics, preferably cotton and rayon fabrics, and provide fabrics having a shrink and/or wrinkle resistant finish depending upon the amount of urea-formaldehyde condensation product applied to the fabric, the method of application and the construction of the fabric. In those instances where a soft and natural hand is desired in the finished fabric, it is preferred to employ a low molecular weight urea-formaldehyde pre-condensate in the finishing composition. The term "low molecular weight" is intended to include essentially monomeric pre-condensates or low polymeric pre-condensates such as the dimers or trimers or mixtures thereof with monomeric pre-condensates.

The compositions of this invention are characterized by their stability at normal mill operating temperatures, that is, temperatures of 70 to 100° F. Normally, these compositions will not become cloudy for a period of 8 hours and this enables their continued use in textile fabric processing plants without discarding the solution because of advanced polymerization of the urea-formaldehyde condensation product. This is a particularly important advantage since the low cost catalysts which have been employed heretofore, namely, the inorganic ammonium salts such as ammonium chloride or diammonium phosphate provide compositions having poor stability at normal room temperatures. The advantages of the compositions of this invention over those containing diammonium phosphate as a catalyst will be pointed out more clearly in the specific examples which appear hereinafter.

The textile finishing compositions of this invention are further characterized by the fact that the urea-formaldehyde condensation product does not polymerize to any appreciable extent during their normal period of use which is generally within a period of 30 minutes to 8 hours depending on the amount of fabric being treated and the rate of processing. The particle size of the condensation product is not substantially increased with the result that the fabric treated in the initial stages when the composition is first prepared does not have a materially different finish than the fabrics treated in the same composition at some subsequent period of time up to about 8 hours.

A preferred finishing composition for treating cellulosic fabrics consists essentially of from 4 to 15% by weight of a water-soluble, low molecular weight urea-formaldehyde condensation product, from 1 to 10% on the weight of the condensation product of a mixture of diethanolamine and monoethanolamine hydrochloride, which mixture has a pH between about 7.5 and 9.0 in a water solution of 35% strength, and water.

A further understanding of this invention will be obtained from the following specific examples which illustrate the invention but are not intended to limit the scope of the invention, parts and percentages being by weight.

EXAMPLE I

*Preparation of latent curing catalyst*

Fifteen and six-tenths parts of diethanolamine, 10.1 parts of monoethanolamine and 42.5 parts of water were mixed together in a vessel equipped with a stirrer and provided with a water jacket. With coolant running through the jacket of the vessel and while the contents of the vessel were being stirred, 31.9 parts of 20° Bé. hydrochloric acid were slowly introduced into the vessel. After all of the hydrochloric acid had been added the solution had a pH of 8.5 and a solids content, as the amine salts, of 34.2%.

EXAMPLE II

*Preparation of latent curing catalyst*

One hundred and forty-three grams of ammonium chloride were dissolved in 400 parts of water. Twenty-five and five-tenths parts of 28% aqueous ammonia were then added to the ammonium chloride solution. This solution was charged to a vessel equipped with a stirrer, an inlet tube and a reflux condenser and the solution was then heated to the reflux temperature. Ethylene oxide was slowly passed into the solution until the weight gain of the solution was 201 parts. Two hundred and thirty cubic centimeters of water were then added to the resulting solution. The product was equivalent to that described in Example I.

EXAMPLE III

A water solution containing 10% by weight of a low molecular weight, water-soluble urea-formaldehyde condensation product was first prepared and to this solution was added the catalytic product prepared as described in Example I, in an amount sufficient to provide 5% of the product on the weight of the urea-formaldehyde condensation product. The solution was placed in a closed jar and heated to a temperature of 40° C. and maintained at that temperature. The solution did not become cloudy until 8 hours had passed.

A similar solution was prepared except that 3% of diammonium hydrogen phosphate on the weight of urea-formaldehyde was used as the catalyst. This solution become cloudy in 5½ hours under the same conditions.

Portions of the above solutions, but not aged, were evaporated to dryness and then baked for 15 minutes at 150° C. Cured solid discs were thus produced, and these were ground separately and placed in closeable containers. Equal quantities of dilute water solutions of sodium carbonate were poured on the powdered resins. The resin cured with diammonium phosphate immediately gave off a fishy, disagreeable odor whereas the resin cured with the catalyst of Example I did not.

EXAMPLE IV

A water solution containing 10% by weight of a low molecular weight, water-soluble urea-formaldehyde condensation product was first prepared and to this was added the water solution prepared as described in Example I in an amount sufficient to provide 5% of the catalyst solution on the weight of the urea-formaldehyde condensation product. The resulting solution was diluted to 8% urea-formaldehyde solids by addition of water, and thereafter padded onto 80 x 80 cotton print cloth and squeezed to deposit 6% of the condensation product on the dry weight of the cloth. The cloth was lightly stretched on frames, dried 5 minutes at 180° F. and then cured 5 minutes at 300° C. The cured cloth was next rinsed and pressed dry.

An identical piece of cloth was treated and cured in the same manner except that the finishing composition contained 3% of diammonium phosphate on the weight of the urea-formaldehyde as a catalyst instead of the amine salts.

Both of the treated and cured pieces of cloth were conditioned at 65% relative humidity and tested for strength, tear resistance and crease resistance. The following data were obtained by averaging tests in the warp and filling direction.

| Catalyst Used | Strength In Pounds | Tear Value In Grams | Crease Angle In Degrees |
|---|---|---|---|
| None | 46.0 | 672 | 75 |
| 3% of Diammonium Phosphate | 32.5 | 416 | 130 |
| 5% of Solution of Diethanolamine and Monoethanolamine Salt | 34.5 | 431 | 132 |

Various modifications and changes may be made in the catalyst mixtures and finishing compositions of this invention, as will be apparent to those skilled in the art to which it appertains without departing from the spirit or intent of this invention. It is accordingly intended that this invention shall only be limited by the scope of the appended claims.

What is claimed is:

1. A latent curing catalyst composition for use with water solutions of urea-formaldehyde condensation products consisting essentially of a water solution of a water-soluble salt of monoethanolamine and a water-soluble salt of diethanolamine, said monoethanolamine and diethanolamine being present in the solution in a mol ratio between 3:1 and 1:3, said solution containing sufficient monoethanolamine and diethanolamine to provide a pH of 7 to 9.

2. A latent curing catalyst composition according to claim 1, but further characterized in that the water-soluble salt of monoethanolamine is monoethanolamine hydrochloride and the water-soluble salt of diethanolamine is diethanolamine hydrochloride.

3. A latent curing catalyst composition according to claim 1, but further characterized in that the water-soluble salt of monoethanolamine is monoethanolamine phosphate and the water-soluble salt of diethanolamine is diethanolamine phosphate.

4. A latent curing catalyst composition for use with water solutions of urea-formaldehyde condensation products consisting essentially of a water solution of a mixture of substantially equimolecular proportions of monoethanolamine hydrochloride and diethanolamine hydrochloride, said solution containing sufficient monoethanolamine and diethanolamine to provide a pH of 7 to 9.

5. A textile finishing composition consisting essentially of a water solution of a water-soluble urea-formaldehyde condensation product and from 1 to 15% by weight, based on said condensation product, of a mixture of a water-soluble salt of monoethanolamine and a water-soluble salt of diethanolamine, the monoethanolamine and diethanolamine being present in said mixture in a mol ratio between 3:1 and 1:3, said mixture containing sufficient monoethanolamine and diethanolamine to provide a pH of 7 to 9 in a water solution.

6. A composition according to claim 5 but further characterized in that the monoethanolamine salt is monoethanolamine hydrochloride and the diethanolamine salt is diethanolamine hydrochloride.

7. A composition according to claim 6, but further characterized in that the monoethanolamine hydrochloride and the diethanolamine hydrochloride are present in the mixture in substantially equimolecular proportions.

8. A composition according to claim 5, but further characterized in that the monoethanolamine salt is monoethanolamine phosphate and the diethanolamine salt is diethanolamine phosphate.

9. A finishing composition for use on cellulosic fabrics consisting essentially of a water solution of from 4 to 15% by weight of a water-soluble and water-dilutable urea-formaldehyde condensation product and from 1 to 10% by weight on the condensation product, of a mixture of substantially equimolecular proportions of monoethanolamine hydrochloride and diethanolamine hydrochloride, said mixture containing sufficient monoethanolamine and diethanolamine to provide a pH of 7 to 9 in water.

References Cited in the file of this patent

UNITED STATES PATENTS

| Number | Name | Date |
|---|---|---|
| 2,137,465 | Thackston | Nov. 22, 1938 |
| 2,317,181 | D'Alelio | Apr. 20, 1943 |
| 2,326,727 | Schroy | Aug. 10, 1943 |